United States Patent
Lee et al.

(10) Patent No.: US 10,104,283 B2
(45) Date of Patent: Oct. 16, 2018

(54) METHOD AND SYSTEM FOR REPRODUCING SITUATION USING MOBILE DEVICE HAVING IMAGE SHOOTING FUNCTION

(71) Applicant: ELECTRONICS AND TELECOMMUNICATIONS RESEARCH INSTITUTE, Daejeon (KR)

(72) Inventors: Seong Ho Lee, Daejeon (KR); YoungHo Suh, Daejeon (KR); Yoon-Seop Chang, Daejeon (KR); Joonmyun Cho, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 84 days.

(21) Appl. No.: 15/431,612

(22) Filed: Feb. 13, 2017

(65) Prior Publication Data
US 2017/0237898 A1 Aug. 17, 2017

(30) Foreign Application Priority Data
Feb. 17, 2016 (KR) .................. 10-2016-0018597

(51) Int. Cl.
*H04N 5/232* (2006.01)
(52) U.S. Cl.
CPC ..... *H04N 5/23222* (2013.01); *H04N 5/23293* (2013.01)

(58) Field of Classification Search
CPC .......... H04N 5/23222; H04N 5/23216; H04N 5/23293; H04N 19/00139; H04N 19/00575; H04N 19/597; H04N 19/85; H04N 19/54; G01C 21/165; G01S 19/13; G01S 19/14; G01S 19/49; G01S 19/39; G01S 19/40; G01S 19/52
USPC ...................................................... 348/222.1
See application file for complete search history.

(56) References Cited

U.S. PATENT DOCUMENTS

| | | | | |
|---|---|---|---|---|
| 6,677,981 B1* | 1/2004 | Mancuso | .............. | G06T 3/4038 348/36 |
| 7,920,161 B2* | 4/2011 | Niemi | .................... | G03B 17/18 348/239 |
| 8,619,120 B2* | 12/2013 | Miyamoto | ......... | H04N 5/23222 348/36 |

(Continued)

FOREIGN PATENT DOCUMENTS

| JP | 2006222690 A | 8/2006 |
|---|---|---|
| JP | 2009239397 A | 10/2009 |

(Continued)

*Primary Examiner* — Pritham Prabhakher

(57) ABSTRACT

Provided is a method for reproducing a situation using a mobile device having an image shooting function. The method may include extracting first keypoints from a live view output to a display of the mobile device, extracting second keypoints from a previously shot image, calculating a tilt of the mobile device at which the first keypoints are mapped to the second keypoints within a critical range, and synthesizing the previously shot image with the live view in a state where the mobile device has been adjusted according to guide information based on a result of the calculating.

20 Claims, 12 Drawing Sheets

(56) References Cited

U.S. PATENT DOCUMENTS

| | | | |
|---|---|---|---|
| 8,754,959 B2* | 6/2014 | Tsurumi | G06T 3/4038 |
| | | | 348/231.2 |
| 8,933,986 B2* | 1/2015 | Schall | G06T 3/4038 |
| | | | 348/37 |
| 9,182,236 B2 | 11/2015 | Roesler | |
| 9,307,165 B2* | 4/2016 | Levy | G06K 9/20 |
| 9,743,106 B2* | 8/2017 | Kim | H04N 19/597 |
| 9,961,264 B2* | 5/2018 | Teo | H04N 5/23293 |
| 2007/0109398 A1* | 5/2007 | Teo | H04N 5/23238 |
| | | | 348/36 |
| 2008/0018748 A1* | 1/2008 | Niemi | G03B 17/18 |
| | | | 348/218.1 |
| 2012/0176515 A1* | 7/2012 | Teo | H04N 5/23238 |
| | | | 348/239 |
| 2015/0063450 A1 | 3/2015 | Kim et al. | |

FOREIGN PATENT DOCUMENTS

| | | |
|---|---|---|
| KR | 1020110035121 A | 4/2011 |
| KR | 10-1241171 B1 | 3/2013 |
| KR | 10-2015-0027985 A | 3/2015 |

* cited by examiner

| Tag Information | Value |
|---|---|
| Image Size | 4800x2700 |
| Horizontal Resolution | 72dpi |
| Vertical Resolution | 72dpi |
| Bit Depth | 24 |
| Shutter Speed | 1/197sec |
| Lens Aperture | F/11.3 |
| Exposure Time | 1/200sec |
| Focal Distance | 25mm |
| Subject Distance | 5m |
| Image Shooting Location | Latitude/Longitude |
| Image Shooting Direction | Directional Information |
| Zoom Ratio | 1 |

METHOD AND SYSTEM FOR REPRODUCING SITUATION USING MOBILE DEVICE HAVING IMAGE SHOOTING FUNCTION

CROSS-REFERENCE TO RELATED APPLICATIONS

This U.S. non-provisional patent application claims priority under 35 U.S.C. § 119 of Korean Patent Application No. 10-2016-0018597, filed on Feb. 17, 2016, the entire contents of which are hereby incorporated by reference.

BACKGROUND

The present disclosure herein relates to a situation reproducing method, and more particularly, to a method for reproducing a past situation using a mobile device having an image shooting function.

Web portal companies are partially providing augmented reality services using an image mapping technology based on image shooting information such as attitude, location, and direction. Up-to-date mobile devices such as smartphones or tablet PCs are provided with an attitude measurement device (e.g., attitude heading reference system (AHRS)) using a GPS module, a gyro sensor, and a geomagnetic sensor. With such development of technology, researches are actively carried out with respect to content-based image mapping for which mobile devices are used.

Meanwhile, Japan Electronic Industry Development Association (JEIDA) has developed an exchangeable image file format (EXIF) for storing information about a shooting location, a shooting direction, or the like of a still image, and the current version of this format is 2.3 (December 2012)

Accordingly, it is required to develop a technology for more easily and more accurately performing image mapping by using a mobile device provided with an attitude measurement device and a file format which enables tagging an image file with a situation at the moment of image shooting.

SUMMARY

The present disclosure provides a method and system for reproducing a past situation by using a previously shot image and a live view output to a mobile device.

An embodiment of the inventive concept provides a method for reproducing a situation using a mobile device having an image shooting function, the method including: extracting first keypoints from a live view output to a display of the mobile device; extracting second keypoints from a previously shot image; calculating a tilt of the mobile device at which the first keypoints are mapped to the second keypoints within a critical range; and synthesizing the previously shot image with the live view in a state where the mobile device has been adjusted according to guide information based on a result of the calculating.

In an embodiment, the method may further include providing the guide information for adjusting the tilt of the mobile device on the basis of the result of the calculating. Furthermore, the guide information may be output to the display of the mobile device, or may be provided via a speaker provided in the mobile device.

In an embodiment, the calculating the tilt of the mobile device may be performed by comparing an inclination and a twist of a straight line formed by two keypoints selected from among the first keypoints with an inclination and a twist of a straight line formed by two keypoints selected from among the second keypoints.

In an embodiment, the synthesizing may include: extracting tag information tagged to the previously shot image; setting a configuration of the mobile device according to the tag information; capturing the live view under the set configuration; and synthesizing the captured live view and the previously shot image. Furthermore, the tag information may include at least one of an image size, a resolution, a bit depth, a shutter speed, a lens aperture, an exposure time, a focal distance, a subject distance, an image shooting location, an image shooting direction, or a zoom ratio.

In an embodiment, the first keypoints and the second keypoints may be extracted using at least one of a speeded up robust features (SURF) algorithm, a scale-invariant feature transform (SIFT) algorithm, a features from accelerated segment test (FAST) algorithm, or a binary robust independent elementary features (BRIEF) algorithm.

In an embodiment, the previously shot image may be selected from a storage device provided in the mobile device, a web storage, or a cloud storage.

In an embodiment of the inventive concept, a method for reproducing a situation using a mobile device having an image shooting function includes: providing first guide information for adjusting a location of the mobile device according to tag information tagged to a previously shot image; extracting first keypoints from a live view output to a display of the mobile device; extracting second keypoints from the previously shot image; determining whether the first keypoints are mapped to the second key points within a critical range; calculating a tilt of the mobile device at which the first keypoints are mapped to the second keypoints within the critical range, according to a result of the determining; providing second guide information for adjusting the tilt of the mobile device on the basis of a result of the calculating; and synthesizing the previously shot image with the live view in a state where the mobile device has been adjusted according to the first guide information and the second guide information.

In an embodiment, the providing the first guide information may include: providing instructions to move the mobile device using GPS information tagged to the previously shot image; providing instructions to move the mobile device using subject distance information tagged to the previously shot image; and providing instructions to adjust an orientation of the mobile device using direction information tagged to the previously shot image.

In an embodiment, the calculating the tilt of the mobile device may be performed by comparing an inclination and a twist of a straight line formed by two keypoints selected from among the first keypoints with an inclination and a twist of a straight line formed by two keypoints selected from among the second keypoints.

In an embodiment, the first guide information and the second guide information may be output to the display of the mobile device, or may be provided via a speaker provided in the mobile device.

In an embodiment, the synthesizing may include: setting a configuration of the mobile device according to the tag information tagged to the previously shot image; capturing the live view under the set configuration; and synthesizing the captured live view and the previously shot image.

In an embodiment, the tag information may include at least one of an image size, a resolution, a bit depth, a shutter speed, a lens aperture, an exposure time, a focal distance, a subject distance, an image shooting location, an image shooting direction, or a zoom ratio.

In an embodiment of the inventive concept, a mobile device includes: a situation reproduction module configured to extract first keypoints from a live view output to a display and second keypoints from a previously shot image, calculate a tilt of the mobile device at which the first keypoints are mapped to the second keypoints within a critical range, and synthesize the previously shot image with the live view in a state where the mobile device has been adjusted according to guide information based on a result of the calculation; a memory configured to load the situation reproduction module; and an application processor configured to execute the situation reproduction module loaded on the memory.

In an embodiment, the situation reproduction module may generate the guide information for providing instructions to adjust a location of the mobile device according to tag information tagged to the previously shot image. Furthermore, the mobile device may further include: a GPS module configured to measure the location of the mobile device; a gyro sensor configured to calculate the tilt of the mobile device; and a geomagnetic sensor configured to measure an image shooting direction of the mobile device. Moreover, the tag information may include at least one of an image size, a resolution, a bit depth, a shutter speed, a lens aperture, an exposure time, a focal distance, a subject distance, an image shooting location, an image shooting direction, or a zoom ratio.

In an embodiment, the situation reproduction module may calculate the tilt by comparing an inclination and a twist of a straight line formed by two keypoints selected from among the first keypoints with an inclination and a twist of a straight line formed by two keypoints selected from among the second keypoints.

In an embodiment, the first keypoints and the second keypoints may be extracted using at least one of a speeded up robust features (SURF) algorithm, a scale-invariant feature transform (SIFT) algorithm, a features from accelerated segment test (FAST) algorithm, or a binary robust independent elementary features (BRIEF) algorithm.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
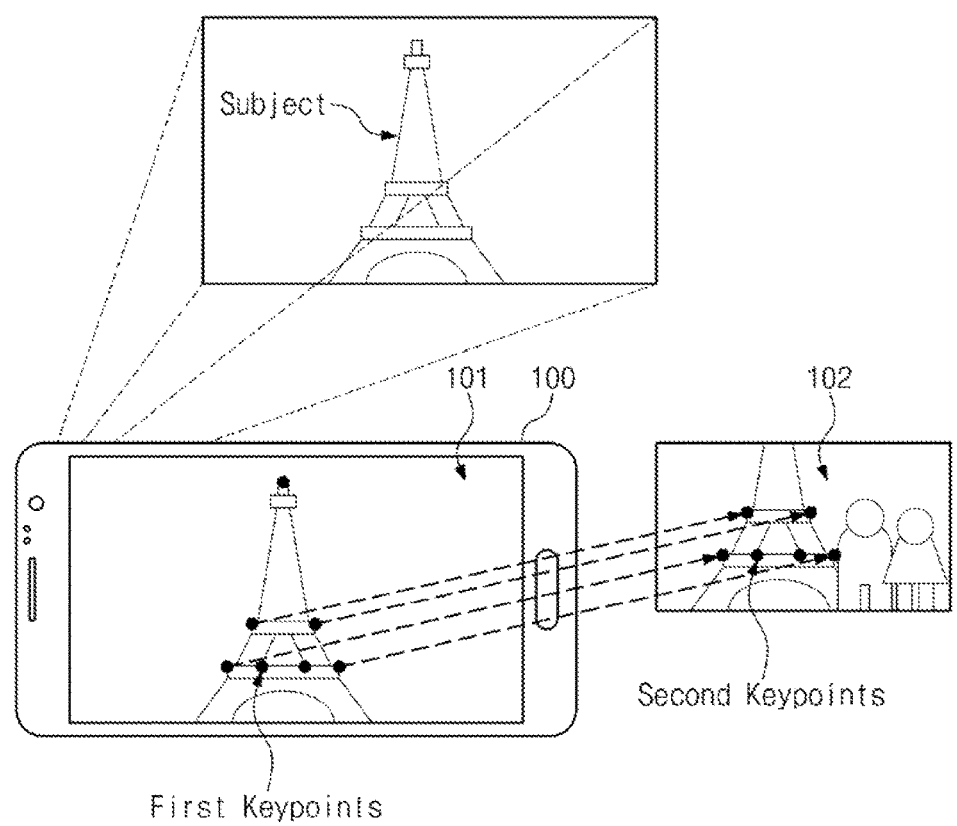
FIG. 1 is a diagram schematically illustrating a situation reproducing method according to an embodiment of the inventive concept.

It should be understood that the above-described background and the following detailed description are exemplarily provided for describing the claimed invention. Reference signs are presented in embodiments of the inventive concept, and examples thereof are illustrated in the accompanying drawings. In any possible case, the same reference numerals are used in the description and the drawings to refer to the same or similar elements.

It will be understood that when an element or a layer is referred to as being "connected to", "coupled to", or "adjacent to" another element or layer, it can be directly connected or coupled to or adjacent to the other element or layer, or it can be indirectly connected or coupled to or adjacent to the other element or layer with an intervening element or layer therebetween. As used herein, the term "and/or" includes any and all combinations of one or more of the associated listed items.

It will be understood that, although the terms "first", "second", etc. may be used herein to describe various elements, these elements should not be limited by these terms. These terms are only used to distinguish one element from other elements. Thus, a first element, section, or layer discussed below could be termed a second element, section, or layer without departing from the teachings of the present invention.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, steps, operations, elements, and/or components, but do not preclude the presence or addition of one or more other features, steps, operations, elements, components, and/or groups thereof.

FIG. 1 is a diagram schematically illustrating a situation reproducing method according to an embodiment of the inventive concept. Hereinafter, an image of a subject viewed through a display of a mobile device 100 is referred to as a live view 101. According to an embodiment of the inventive concept, a situation at the time of shooting a previously shot image 102 may be reproduced by synthesizing the previously shot image 102 and the live view 101.

A method for reproducing an attitude according to an embodiment of the inventive concept is briefly described below. First, an image of a subject is made to be viewed on the display of the mobile device 100. An application, firmware, software, or the like provided to the mobile device 100 may extract keypoints of the live view 101. The keypoints of the live view 101 may be extracted using various algorithms such as speeded up robust features (SURF), scale-invariant feature transform (SIFT), features from accelerated segment test (FAST), binary robust independent elementary features (BRIEF), etc. Furthermore, the application, firmware, software, or the like provided in the mobile device 100 may extract the keypoints of the previously shot image 102. In a similar manner, the keypoints of the previously shot image 102 may be extracted using the above-mentioned various algorithms.

When the keypoints of the live view 101 and the keypoints of the previously shot image 102 are mapped within a certain critical range, the image of the subject may be shot by the mobile device 100. That is, the live view 101 may be captured by the mobile device 100 in a state where the keypoints of the live view 101 and the keypoints of the previously shot image 102 are mapped within the certain critical range. The application, firmware, software, or the like provided in the mobile device synthesizes the captured live view 101 and the previously shot image 102. That is, a shooting situation, attitude, and the like of the past may be reproduced by synthesizing the previously shot image 102 which was shot in the past with the live view 101 currently shot.

On the other hand, when the keypoints of the live view 101 and the keypoints of the previously shot image 102 are not mapped within the certain critical range, guide information for mapping the former keypoints and the latter keypoints to each other may be displayed on the display of the mobile device 100. For example, the guide information may include a guide text about rotation, movement, tilt adjustment, or the like of the mobile device 100. However, the guide information is not necessarily required to be displayed as a text on the display of the mobile device 100, and thus may be provided as a voice through a speaker (not shown) of the mobile device 100.

A user of the mobile device 100 may move, tilt, or rotate the mobile device 100 according to the guide information displayed on the display of the mobile device 100. According to this adjustment, the keypoints of the live view 101 displayed on the display of the mobile device 100 may be re-extracted. Once first keypoints re-extracted from the live view 101 are mapped to second keypoints extracted from the previously shot image 102, the live view 101 may be captured. Furthermore, the application, firmware, software, or the like provided in the mobile device synthesizes the captured live view 101 and the previously shot image 102. As a result, a shooting situation, attitude, and the like of the past may be reproduced by synthesizing the previously shot image 102 which was shot in the past with the live view 101 currently shot.

Figure 2:
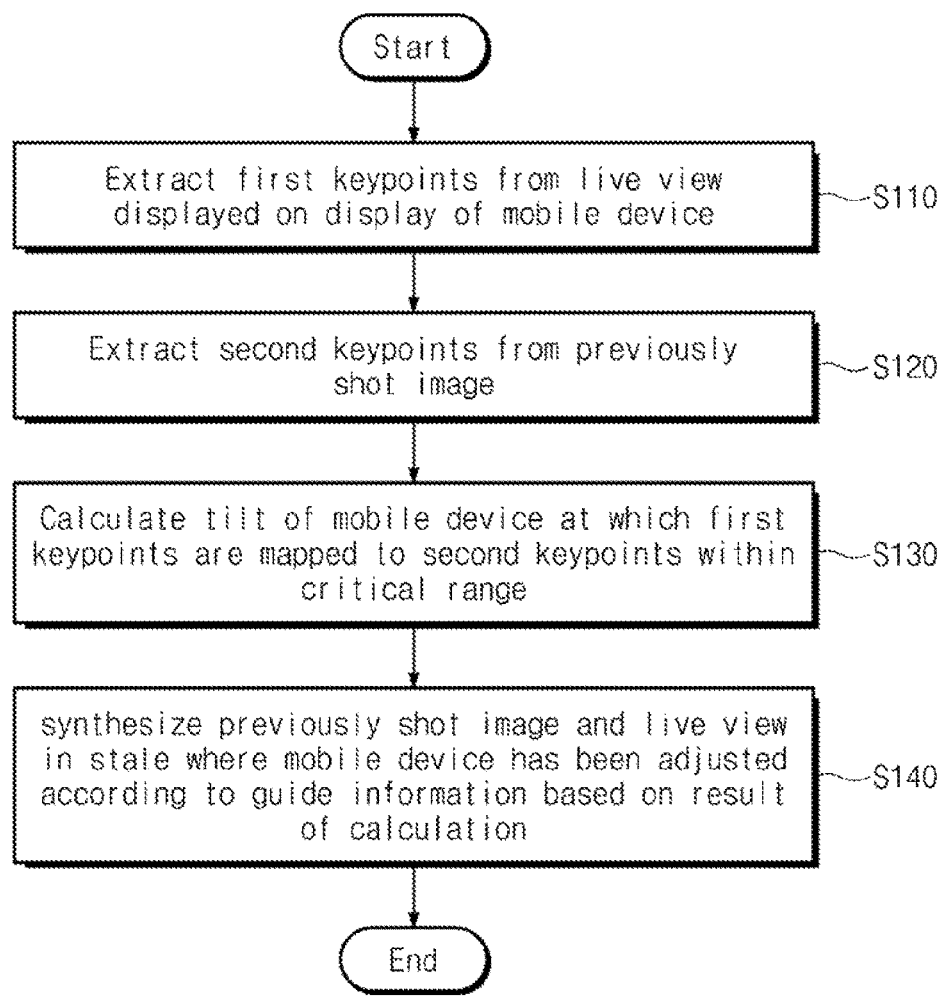
FIG. 2 is a flowchart illustrating a situation reproducing method according to an embodiment of the inventive concept.

FIG. 2 is a flowchart illustrating a situation reproducing method according to an embodiment of the inventive concept. The situation reproducing method may be implemented using the application, firmware, or software provided in the mobile device 100 illustrated in FIG. 1.

In operation S110, first keypoints may be extracted from the live view 101 input through a lens of the mobile device 100. The keypoints of the live view 101 may be extracted using various algorithms such as SURF, SIFT, FAST, BRIEF, etc., as described above. However, an embodiment of the inventive concept is not limited thereto, and thus other various algorithms may be used to extract keypoints.

In operation S120, second keypoints may be extracted from the previously shot image 102. As described above with respect to operation S110, various algorithms may be used to extract the second keypoints. Although FIG. 2 illustrates that operation S120 is performed after operation S110, the order may not be limited thereto. That is, the first keypoints may be extracted from the live view 101 after the second keypoints are extracted from the previously shot image 102, or the first keypoints and the second keypoints may be simultaneously extracted.

For example, the previously shot image 102 may be an image stored in the mobile device 100 and selected by the user of the mobile device 100. Alternatively, the previously shot image 102 may be an image stored in a web storage or a cloud storage and loaded by the user of the mobile device 100.

In operation S130, a tilt of the mobile device 100 at which the first keypoints extracted from the live view 101 may be mapped to the second keypoints extracted from the previously shot image 102 may be calculated. Here, the fact that the first keypoints are mapped to the second keypoints may represent that the first keypoints exactly or substantially match the second keypoints in three dimensions without an inclination or twist in comparison with the second keypoints.

For example, the tilt of the mobile device 100 at which the first keypoints may be mapped to the second keypoints may be measured using a gyroscope (or gyro sensor) or the like installed in the mobile device 100. The present operation may include an operation of detecting a correspondence relationship between the first keypoints and the second keypoints, and an operation of calculating a degree of inclination or twist of the first keypoints in comparison with the second keypoints. The application, firmware, or software provided in the mobile device 100 may repeatedly perform an operation such as tilting, twisting, zooming in, or zooming out the first keypoints arranged on the same plane, so as to calculate the tilt of the mobile device 100 at which the first keypoints are mapped to the second keypoints. This operation performed in the mobile device 100 is described in more detail below with reference to FIGS. 3 to 8.

For example, the present operation may be performed by comparing the first keypoints with the second keypoints. For example, the degree of inclination or twist of the live view 101 output to the display of the mobile device 100 in comparison with the previously shot image 102 may be calculated by comparing a plurality of straight lines formed by two keypoints selectable from the first keypoints with a plurality of straight lines formed by two keypoints selectable from the second keypoints.

Guide information based on a result of the calculation of the present operation may be displayed on the display of the mobile device 100. For example, the guide information may include a guide text such as "rotate the mobile device 100 left/right", "tilt the mobile device 100 forward/backward", etc. However, the guide information is not limited thereto. For example, the guide information may be provided as a voice to the user through the speaker provided in the mobile device 100. The user may make a motion such as moving or tilting the mobile device 100 according to the guide information.

In operation S140, the live view 101 obtained in a state where the mobile device 100 has been adjusted according to the guide information based on the result of the calculation of operation S130 and the previously shot image 102 may be synthesized. Once the mobile device 100 is adjusted in response to the user's motion of moving or tilting the mobile device 100 according to the guide information, the first keypoints extracted from the live view 101 and the second keypoints extracted from the previously shot image 102 may be mapped to each other within the critical range. Therefore, even though the previously shot image 102 is synthesized with the live view 101 obtained in the state where the mobile device 100 has been adjusted, a natural image may be obtained, and as a result, the situation at the time of shooting the previously shot image 102 may be reproduced as it was.

The situation reproducing method using the mobile device 100 has been described briefly with reference to the drawings. According to this method, the situation at the time of shooting the previously shot image 102 may be reproduced with ease by making the first keypoints extracted from the live view 101 and the second keypoints extracted from the previously shot image 102 match each other by comparing the first keypoints with the second keypoints.

Figure 3:
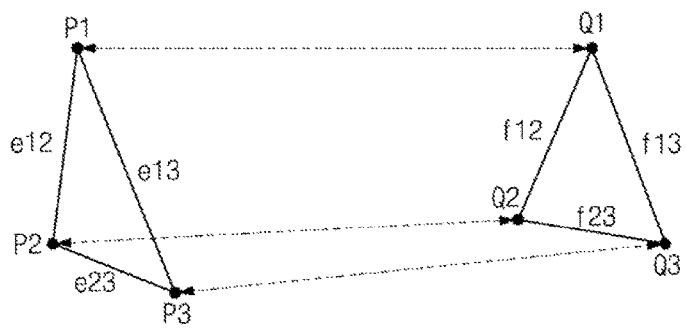
FIG. 3 is a diagram schematically illustrating a correspondence relationship between first keypoints extracted from a live view and second keypoints extracted from a previously shot image.

FIG. 3 is a diagram schematically illustrating the correspondence relationship between the first keypoints extracted from the live view 101 and the second keypoints extracted from the previously shot image 102. Left keypoints P1 to P3 of FIG. 3 represent the first keypoints extracted from the live view 101, and right keypoints Q1 to Q3 of FIG. 3 represent the second keypoints extracted from the previously shot image 102. A distance between the keypoints P1 and P2 is e12, a distance between the keypoints P2 and P3 is e23, and a distance between the keypoints P1 and P3 is e13. A distance between the keypoints Q1 and Q2 is f12, a distance between the keypoints Q2 and Q3 is f23, and a distance between the keypoints Q1 and Q3 is f13. Unlike the keypoints of the subject illustrated in FIG. 1, the number of the keypoints extracted from the live view 101 or the keypoints extracted from the previously shot image 102 is assumed as three for ease of description.

To reproduce the situation at the time of shooting the previously shot image 102, the first keypoints and the second keypoints may be mapped to each other within the critical range. To determine whether the first keypoints and the second keypoints are mapped to each other, the correspondence relationship between the first keypoints extracted from the live view 101 and the second keypoints extracted from the previously shot image 102 may be detected. This correspondence relationship may be detected by comparing arrangements of the first keypoints P1 to P3 and the second keypoints Q1 to Q3 and the distances among the keypoints e12, e23, e13, f12, f23, and f13. For example, the correspondence relationship may be detected using the application, firmware, or software provided in the mobile device 100.

FIGS. 4 to 8 are diagrams illustrating specific examples of operation S160 of FIG. 2. To assist with understanding, it is assumed that the mobile device 100 is disposed on an XY plane, the first keypoints extracted from the live view 101 are P1 to P3, and the second keypoints extracted from the previously shot image are Q1 to Q3. Although FIGS. 4 to 8 illustrate that the keypoints are displayed on the display of the mobile device 100, the keypoints may not be displayed on the display of the mobile device 100. This illustration is intended to indicate that the mobile device 100 may be rotated with respect to an X, Y, or Z axis according to the guide information.

Figure 4:
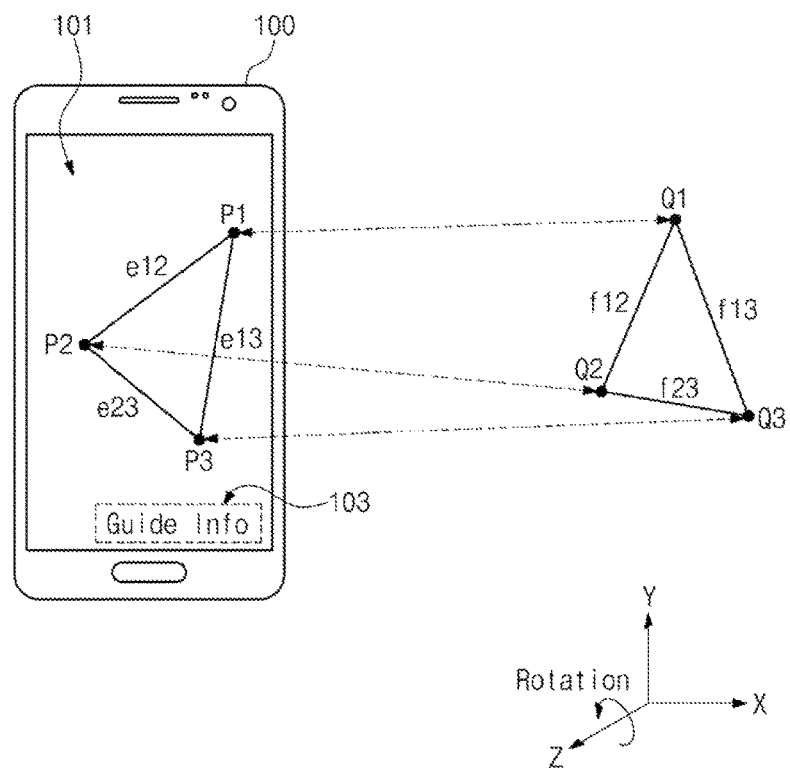
FIGS. 4 to 8 are diagrams illustrating specific examples of operation S160 of FIG. 2.

Referring to FIG. 4, the distance e12 is equal to the distance f12, the distance e23 is equal to the distance f23, and the distance e13 is equal to the distance f13. This case may be construed as a case where the live view 101 is not twisted nor inclined in comparison with the previously shot image 102, but is merely rotated with respect to the Z axis. In this case, the degree of rotation of the first keypoints extracted from the live view 101 may be calculated. For example, the degree of rotation of the first keypoints may be calculated using the application, firmware, or software provided in the mobile device 100.

The calculated degree of rotation may be displayed as guide information 103 on the display of the mobile device 100. For example, the guide information may be a guide text such as "rotate the mobile device 100 counterclockwise by a certain angle". However, an embodiment of the inventive concept is not limited thereto, and thus the guide information 103 may be provided to the user through the speaker (not shown) provided in the mobile device 100.

Once the user rotates the mobile device 100 according to the guide information 103 provided to the user, the first keypoints may be re-extracted from the live view 101. When it is determined that the re-extracted first keypoints and the second keypoints extracted from the previously shot image 102 are mapped to each other within the critical range, the live view 101 may be captured. This capturing may mean that the image of the subject at the moment of the mapping is shot.

Thereafter, the captured live view 101 may be synthesized with the previously shot image 102, and as a result, the situation at the time of shooting the previously shot image 102 may be reproduced. For example, this series of operations may be performed using the application, firmware, or software provided in the mobile device 100.

Figure 5:
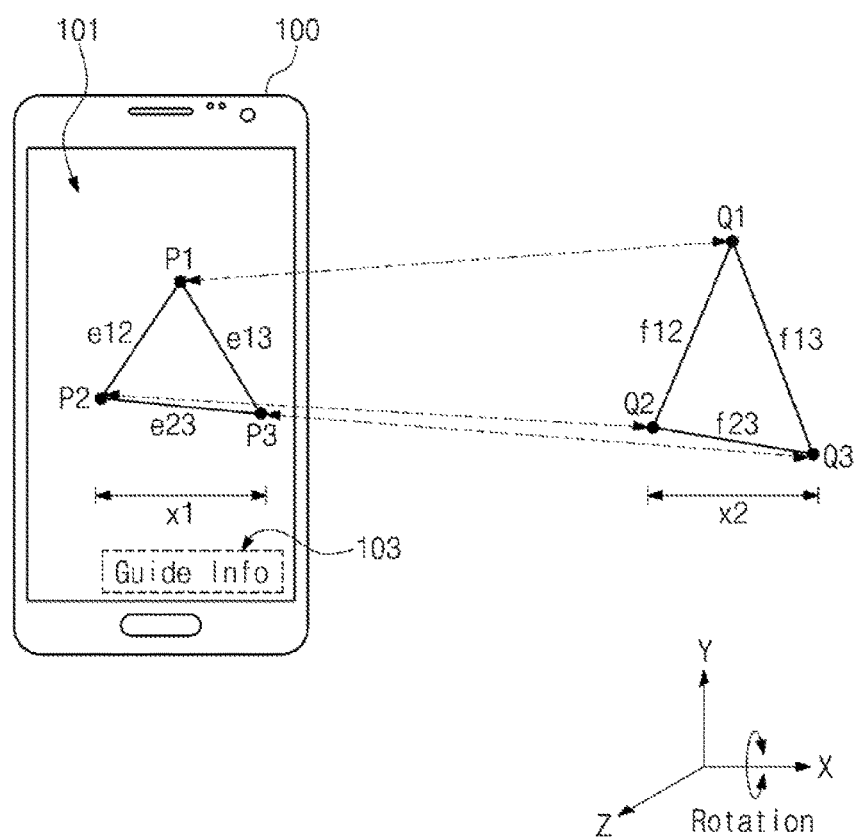

Referring to FIG. 5, a distance x1 between the keypoints P2 and P3 in an X axis direction is equal to a distance x2 between the keypoints Q2 and Q3 in the X axis direction. In this case, the distance e12 differs from the distance f12, the distance e23 differs from the distance f23, and the distance e13 differs from the distance f13. This case may be construed as a case where the live view 101 is merely rotated with respect to the X axis in comparison with the previously shot image 102. In this case, the degree of rotation of the first keypoints extracted from the live view 101 may be calculated. For example, the degree of rotation of the first keypoints may be calculated using the application, firmware, or software provided in the mobile device 100.

The calculated degree of rotation may be displayed as the guide information 103 on the display of the mobile device 100. For example, the guide information may be a guide text such as "tilt the mobile device 100 backwards" or "tilt the mobile device 100 forwards". However, an embodiment of the inventive concept is not limited thereto, and thus the guide information 103 may be provided to the user through the speaker (not shown) provided in the mobile device 100.

Once the user tilts the mobile device 100 backwards or forwards according to the guide information 103 provided to the user, the first keypoints may be re-extracted from the live view 101. When it is determined that the re-extracted first keypoints and the second keypoints extracted from the previously shot image 102 are mapped to each other within the critical range, the live view 101 may be captured. This capturing may mean that the image of the subject at the moment of the mapping is shot.

Thereafter, the captured live view 101 may be synthesized with the previously shot image 102, and as a result, the situation at the time of shooting the previously shot image 102 may be reproduced. For example, this series of operations may be performed using the application, firmware, or software provided in the mobile device 100.

Figure 6:
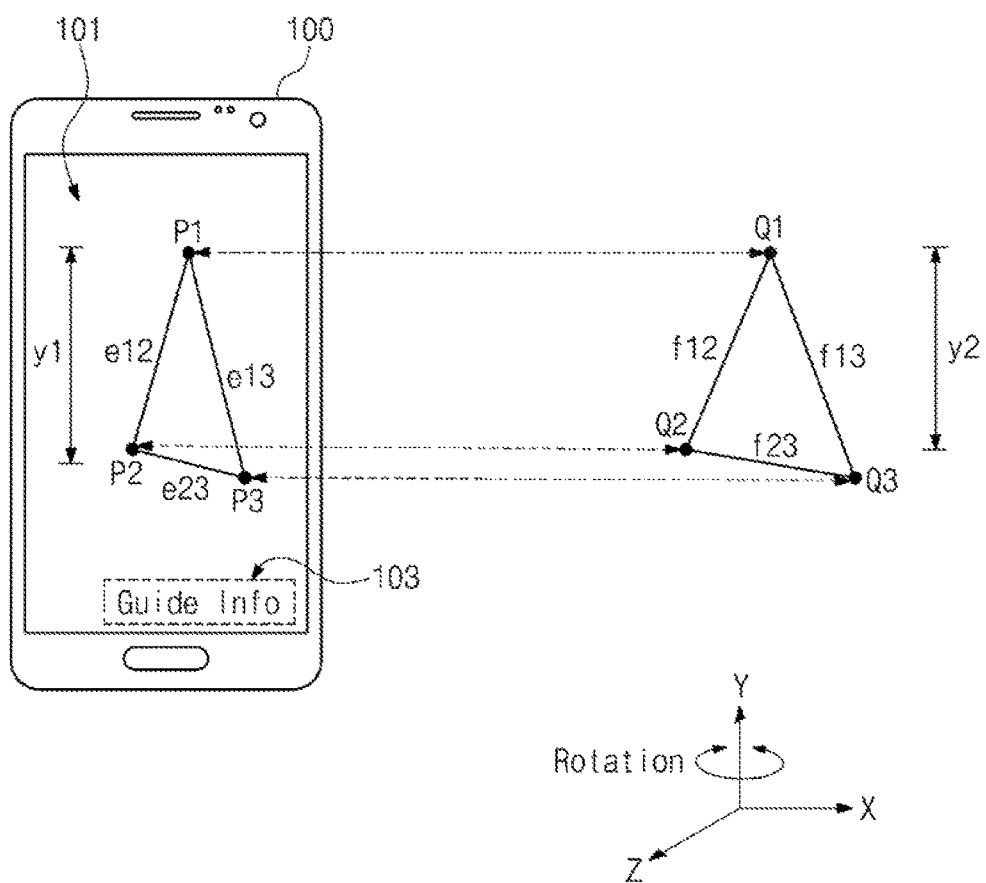

Referring to FIG. 6, a distance y1 between the keypoints P1 and P2 in a Y axis direction is equal to a distance y2 between the keypoints Q1 and Q2 in the Y axis direction. In this case, the distance e12 differs from the distance f12, the distance e23 differs from the distance f23, and the distance e13 differs from the distance f13. This case may be construed as a case where the live view 101 is merely rotated with respect to the Y axis in comparison with the previously shot image 102. In this case, the degree of rotation of the first keypoints extracted from the live view 101 may be calculated. For example, the degree of rotation of the first keypoints may be calculated using the application, firmware, or software provided in the mobile device 100.

The calculated degree of rotation may be displayed as the guide information 103 on the display of the mobile device 100. For example, the guide information may be a guide text such as "rotate the mobile device 100 counterclockwise like a revolving door" or "rotate the mobile device 100 clockwise like a revolving door". However, an embodiment of the inventive concept is not limited thereto, and thus the guide information 103 may be provided to the user through the speaker (not shown) provided in the mobile device 100.

Once the user rotates the mobile device 100 according to the guide information 103 provided to the user, the first keypoints may be re-extracted from the live view 101. When it is determined that the re-extracted first keypoints and the second keypoints extracted from the previously shot image 102 are mapped to each other within the critical range, the live view 101 may be captured. This capturing may mean that the image of the subject at the moment of the mapping is shot.

Thereafter, the captured live view 101 may be synthesized with the previously shot image 102, and as a result, the situation at the time of shooting the previously shot image 102 may be reproduced. For example, this series of operations may be performed using the application, firmware, or software provided in the mobile device 100.

Although FIGS. 4 to 6 illustrate that the keypoints extracted from the live view 101 are rotated with respect to any one of the X, Y, and Z axes, the mobile device 100 may be rotated with respect to all of the X, Y, and X axes in most cases. In such cases, the tilt of the mobile device 100 at which the first keypoints are mapped to the second keypoints may be calculated by repeatedly performing an operation such as tilting, twisting, zooming in, or zooming out the first keypoints.

Figure 7:
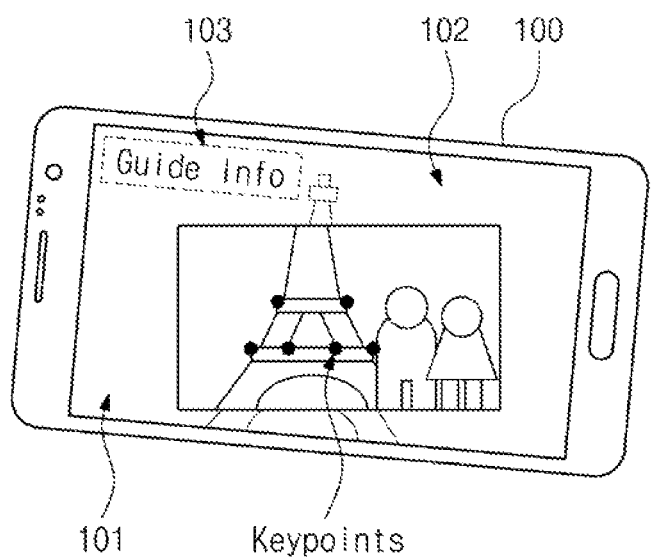
Figure 8:
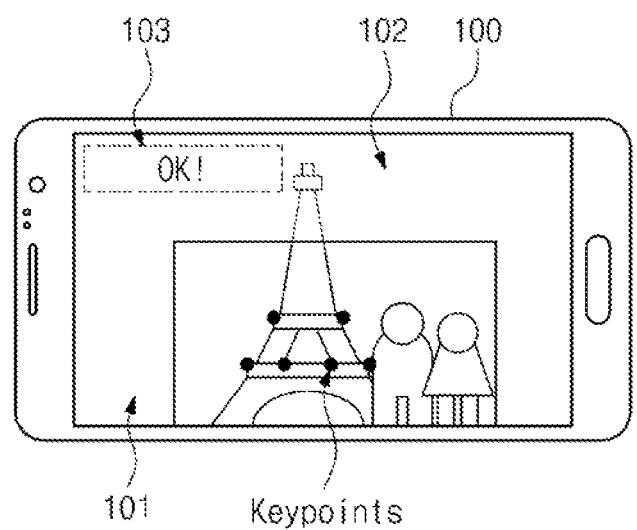

FIGS. 7 and 8 are diagrams schematically illustrating examples in which the situation reproducing method according to an embodiment of the inventive concept is implemented using the mobile device 100. Although not illustrated in FIGS. 7 and 8, it is assumed that a subject (not shown) exists beyond the mobile device 100, and the image of the subject incident through the lens of the mobile device 100 is displayed as the live view 101 through the display after undergoing image processing.

Referring to FIG. 7, when a situation reproducing application, firmware, or software provided in the mobile device 100 is executed, the first keypoints may be extracted from the live view 101. Furthermore, the second keypoints may be extracted from the previously shot image 102. The previously shot image 102 required to reproduce a situation desired by the user may be prestored in the mobile device 100, a web storage (not shown), or a cloud storage (not shown) and may be selected by the user. Although FIG. 7 illustrates that the keypoints of the previously shot image 102 are displayed on the display of the mobile device 100, this illustration is merely intended to assist with understanding, and thus the second keypoints may not be displayed on the display of the mobile device 100.

After the first keypoints and the second keypoints are extracted, the degree of inclination or twist of the first keypoints in comparison with the second keypoints may be calculated. On the basis of a calculated value, the guide information may be displayed on the mobile device 100. The guide information 103 may include instructions to rotate the mobile device 100 with respect to the X, Y, or Z axis. For example, the guide information may be specific instructions (guidance) such as "tilt the mobile device 100 to the left/right" or "tilt the mobile device 100 forwards/backwards". However, this guide information 103 is not limited thereto, and thus may be provided through the speaker (not shown) provided in the mobile device 100.

Once the user moves, rotates, or tilts the mobile device 100 according to the guide information 103 displayed on the display of the mobile device 100, the first keypoints may be re-extracted from the live view 101. When the re-extracted first keypoints and the second keypoints are mapped to each other within the critical range, the live view 101 may be captured as illustrated in FIG. 8. That is, at the moment when the re-extracted first keypoints and the second keypoints are mapped to each other within the critical range, the image of the subject may be shot by the mobile device 100.

Figure 9:
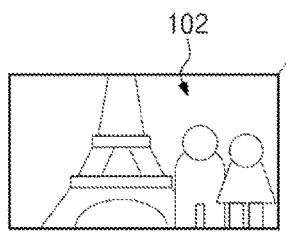
FIG. 9 is a diagram exemplarily illustrating pieces of tag information with which a previously shot image is tagged.

Thereafter, the captured live view 101 may be synthesized with the previously shot image 102. In this manner, the situation at the time of previously shot image may be reproduced with ease by visiting a place where the previously shot image 102 was shot and using the live view 101 displayed on the mobile device 101. Although FIGS. 7 and 9 illustrate that the previously shot image 102 is displayed on the display of the mobile device 100, the previously shot image 102 may not be displayed on the display. That is, according to embodiments of the inventive concept, only the live view 101 and the guide information 103 based on a value calculated by comparing the first keypoints and the second keypoints may be displayed on the display of the mobile device 100.

Embodiments in which a position, angle, tilt, etc. of the mobile device 100 are adjusted according to the guide information 103 based on a result of comparison between the first keypoints and the second keypoints have been described with reference to FIGS. 1 to 8. However, the guide information 103 may also be provided on the basis of various tag information with which the previously shot image 102 is tagged. Relevant embodiments are described in detail below with reference to FIGS. 9 to 12.

FIG. 9 is a diagram exemplarily illustrating pieces of tag information with which the previously shot image 102 is tagged. At the time of generating the previously shot image 102 (i.e., at the time of shooting an image of a subject), the previously shot image 102 may be tagged with various tag information. The previously shot image 102 may be tagged with various information indicating various situations at the time of image shooting. For example, the tag information may include size information of an image, horizontal/vertical resolution information, bit depth, shutter speed, lens aperture, exposure time, focal distance, subject distance, image shooting location, image shooting direction, zoom ratio, etc. However, this is merely an example, and thus various other information for indicating the situation at the time of image shooting may be included.

A format for storing such tag information may include an exchangeable image file format (EXIF). For example, the EXIF standard is used for JPEG, TIFF, WAV, etc. However, not only image files compatible with the EXIF format are used, and various other standards for tagging with various information at the time of image shooting may be used.

Information about an image size, horizontal/vertical resolution, bit depth, shutter speed, lens aperture, exposure time, and focal distance with which the previously shot image 102 is to be tagged with may be generated by an image sensor circuit, and these pieces of information may be tagged to the previously shot image 102 when the previously shot image 102 is generated.

The subject distance information, for example, may be measured using an infrared sensor provided in the mobile device 100. When the image of the subject is shot using the mobile device 100 provided with a camera module which performs auto-focusing with an infrared sensor, the distance between an image shooting place and the subject may be measured. The distance between the image shooting place and the subject may be approximately measured by using an auto-focusing function for focusing on the subject by irradiating infrared light to the subject and measuring a time taken for the infrared light to be reflected and return. The subject distance information may also be tagged to the previously shot image 102 when the previously shot image 102 is generated.

The information about image shooting location, for example, may be measured by a global positioning system (GPS) module provided in the mobile device 100. However, an embodiment of the inventive concept is not limited thereto, and thus the information about image shooting location may be measured using various navigation standards such as GLONASS, Compass, Galileo, and QZSS. Coordinates of the image shooting location may include latitude and longitude. The information about image shooting location may also be tagged to the previously shot image 102 when the previously shot image 102 is generated.

The image shooting direction information, for example, may be measured by a geomagnetic sensor provided in the mobile device 100. The geomagnetic sensor measures the image shooting direction using the earth's magnetic field, and the image shooting direction information may be tagged to the previously shot image 102 when the previously shot image 102 is generated.

Figure 10:
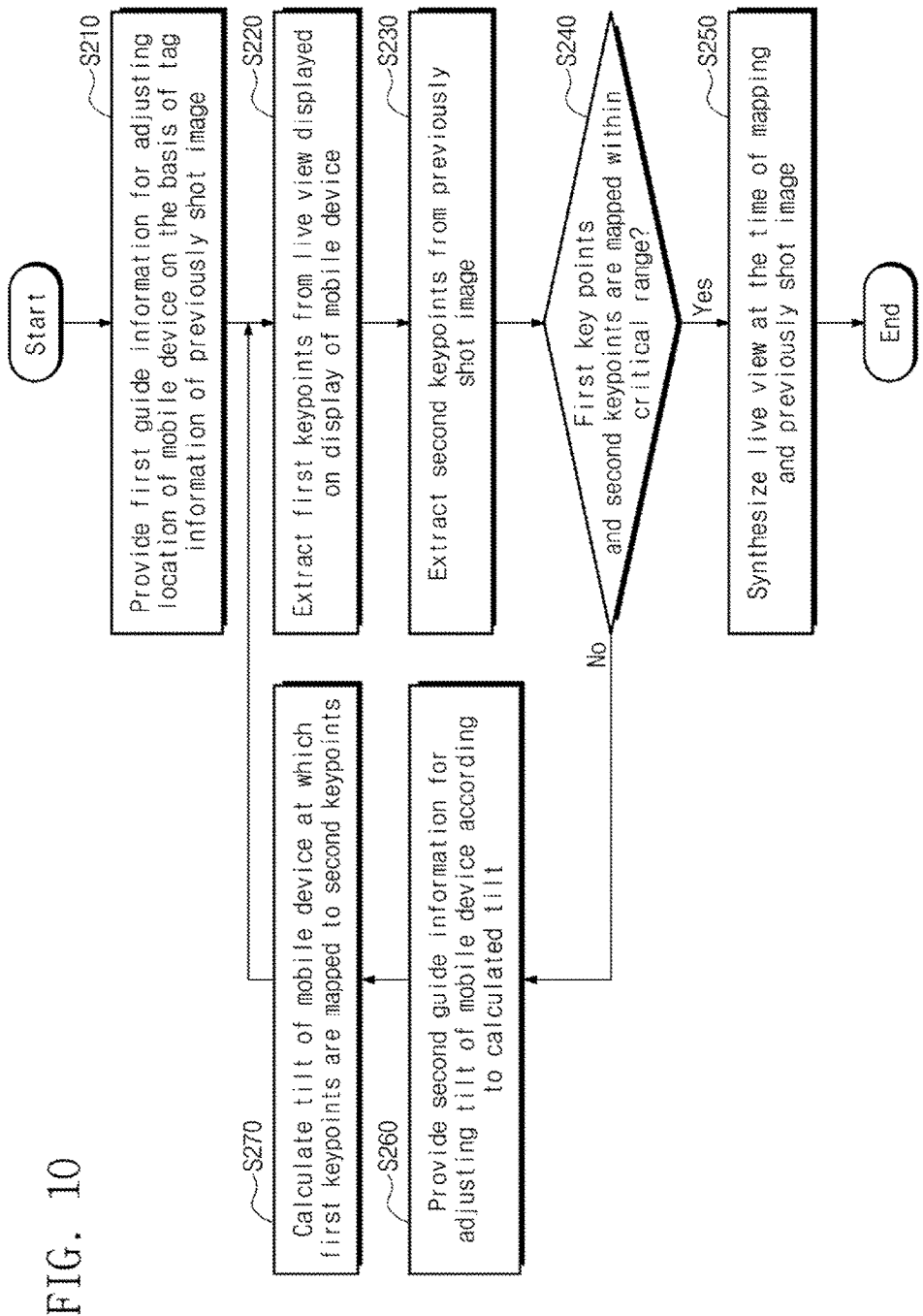
FIG. 10 is a flowchart illustrating a situation reproducing method according to another embodiment of the inventive concept.

FIG. 10 is a flowchart illustrating a situation reproducing method according to another embodiment of the inventive concept. The situation reproducing method may be implemented using the application, firmware, or software provided in the mobile device 100 illustrated in FIG. 1. This method is described below with reference to FIGS. 1, 9, and 10.

In operation S210, first guide information for adjusting the location of the mobile device 100 on the basis of the tag information tagged to the previously shot image 102 may be provided. The first guide information may be provided on the basis of the information about image shooting location and the image shooting direction information from among the pieces of the tag information of the previously shot image 102.

For example, if a current location of the mobile device 100 is able to be measured using a GPS module or the like, for example, guide information for instructing the user to walk a few steps towards a certain location may be provided using the information about image shooting location tagged to the previously shot image 102. Furthermore, guide information for instructing the user to move in a certain direction may be provided using the image shooting direction information tagged to the previously shot image 102. As a result, the image shooting location and the image shooting direction at the time of shooting the previously shot image 102 may be approximately reproduced.

However, the guide information based on information measured by a GPS module and a geomagnetic sensor may have a certain level of error. This is because a GPS technology has a certain level of error per se. Therefore, it is required to provide a more detailed guide to the user so as to compensate for such an error. This detailed guide may be provided on the basis of results of extraction and comparison of keypoints described below.

In operation S220, first keypoints may be extracted from the live view 101 input through the lens of the mobile device 100. The keypoints of the live view 101 may be extracted using various algorithms such as SURF, SIFT, FAST, BRIEF, etc., as described above. However, an embodiment of the inventive concept is not limited thereto, and thus other various algorithms may be used to extract keypoints.

In operation S230, second keypoints may be extracted from the previously shot image 102. However, as described above with respect to operation S220, various algorithms may be used to extract the second keypoints. Although FIG. 10 illustrates that operation S230 is performed after operation S220, the order may not be limited thereto. That is, the first keypoints may be extracted from the live view 101 after the second keypoints are extracted from the previously shot image 102, or the first keypoints and the second keypoints may be simultaneously extracted.

For example, the previously shot image 102 may represent an image stored in the mobile device 100 and selected by the user of the mobile device 100. Alternatively, the previously shot image 102 may represent an image stored in a web storage or a cloud storage and loaded by the user of the mobile device 100.

In operation S240, it may be determined whether the first keypoints and the second keypoints are mapped within the critical range. The fact that the first keypoints and the second keypoints are exactly mapped represents that the live view 101 currently displayed through the display of the mobile device 100 reflects the situation at the time of shooting the previously shot image 102 as it was. That is, this may represent that the coordinates of an image shooting location, an image shooting angle or inclination, etc. at the time of shooting the previously shot image 102 are currently reproduced.

However, it may be very difficult and practically impossible to reproduce the situation at the time of shooting the previously shot image 102 as it was. Therefore, the situation at the time of shooting the previously shot image 102 may be considered to be reproduced, when the first keypoints extracted from the live view 101 and the second keypoints extracted from the previously shot image 102 are mapped to each other within a certain critical range. According to a result of the determination, the process may proceeds to different operations. If it is determined that the first keypoints and the second keypoints are mapped to each other within the critical range (Yes), operation S250 is performed, or otherwise (No), operation S260 is performed.

In operation S250, the image of the live view 101 may be synthesized with the previously shot image 102. That is, at the moment when it is determined that the first keypoints and the second keypoints are mapped to each other within the critical range, the image of the subject may be shot. (This represents that the live view 101 is captured.) Furthermore, a configuration (e.g., image size, resolution, shutter speed, exposure time, etc.) of the mobile device 100 may be set to be the same as that at the time of shooting the previously shot image 102. This is intended to naturally synthesize the captured live view 101 and the previously shot image 102 without giving a sense of difference. For example, such a configuration related to the camera module of the mobile device 100 may be automatically set by the application, firmware, or software installed in the mobile device 100.

An image shot on the basis of this configuration may be synthesized with the previously shot image 102. As a result, the situation at the time of shooting the previously shot image 102 may be reproduced. That is, this represents that the image shooting location, the image shooting direction, the image shooting angle or inclination, etc. of a current subject are approximately the same as those at the time of shooting the previously shot image 102.

In operation S260, an angle or tilt of the mobile device 100 at which the first keypoints and the second keypoints are mapped to each other may be calculated. For example, the angle or tilt of the mobile device 100 at which the first keypoints are mapped to the second keypoints may be measured using a gyroscope (or gyro sensor) or the like installed in the mobile device 100. The present operation may include an operation of detecting the correspondence relationship between the first keypoints and the second keypoints, and an operation of calculating the degree of inclination or twist of the first keypoints in comparison with the second keypoints. The application, firmware, or software provided in the mobile device 100 may repeatedly perform an operation such as tilting or twisting the first keypoints arranged on the same plane, so as to calculate the location, tilt, etc. of the mobile device 100 at which the keypoints are mapped to the second keypoints. Such operations performed in the mobile device 100 are similar to those described above with reference to FIGS. 3 to 8.

In operation S270, second guide information for adjusting the tilt of the mobile device 100 may be provided according to the calculated location and tilt. For example, the second guide information may be displayed on the display of the mobile device 100 so that the user may move the mobile device 100 according to the calculated tilt. For example, the second guide information may include instructions (guidance) for rotating the mobile device 100 left/right or tilting the mobile device 100 forwards/backwards. However, the guide information is not limited thereto. For example, the second guide information may be provided as a voice to the user through the speaker provided in the mobile device 100.

After the user moves or tilts the mobile device 100 according to the second guide information provided to the user of the mobile device 100, the first keypoints may be re-extracted from the live view 101 (S220).

Figure 11:
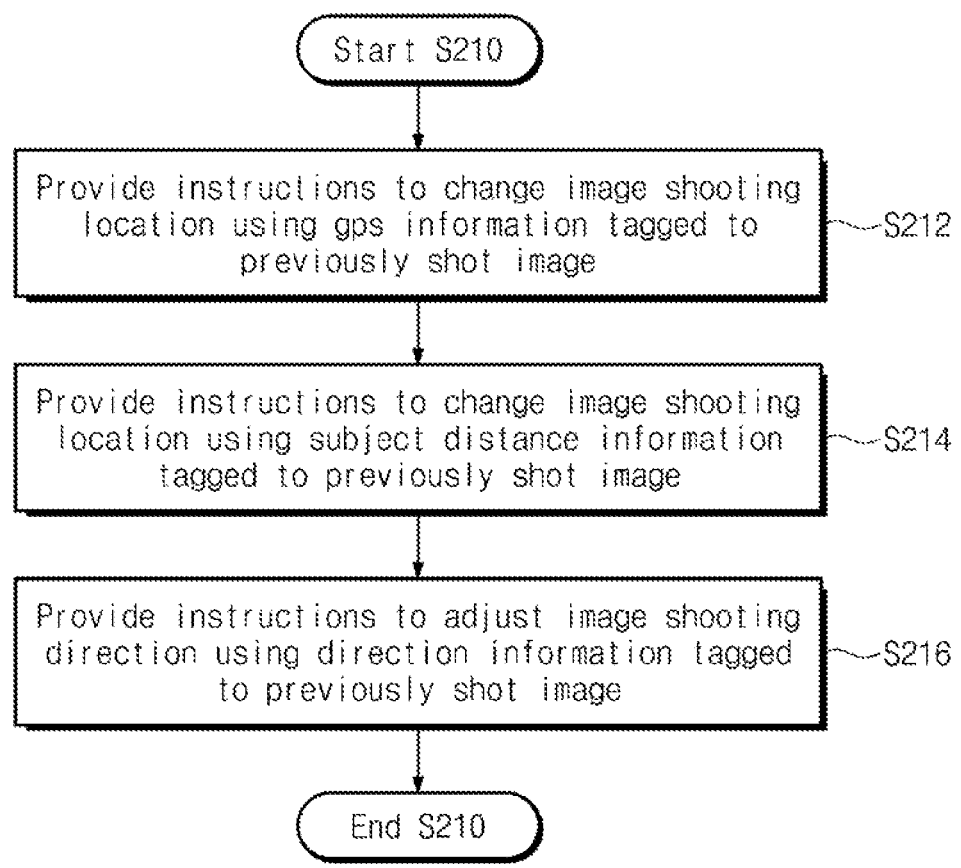
FIG. 11 is a flowchart illustrating operation S210 of FIG. 10 in more detail.

FIG. 11 is a flowchart illustrating operation S210 of FIG. 10 in more detail.

In operation S212, an operation of giving a guide for changing an image shooting location may be performed using the information about image shooting location (e.g., GPS information) tagged to the previously shot image 102.

In operation S214, an operation of giving a guide for changing the image shooting location may be performed using the subject distance information tagged to the previously shot image 102. Since the GPS information provided in operation S212 may have an error, the guide based on the subject distance information may be provided so as to reduce an error between a current image shooting location and an image shooting location at the time of shooting the previously shot image 102.

In operation S216, an operation of giving a guide for adjusting an image shooting direction may be performed using the image shooting direction information tagged to the previously shot image 102. For example, the image shooting direction information tagged to the previously shot image 102 may be measured by the geomagnetic sensor installed in the mobile device 100.

The operations described above with reference to FIG. 11 may enable approximate reproduction of the situation at the time of shooting the previously shot image 102, prior to comparison of the keypoints. Since the guide information is provided on the basis of a result of comparison of the keypoints, and the tag information tagged to the previously shot image 102 is also used, the situation at the time of image shooting may be reproduced more accurately.

Figure 12:
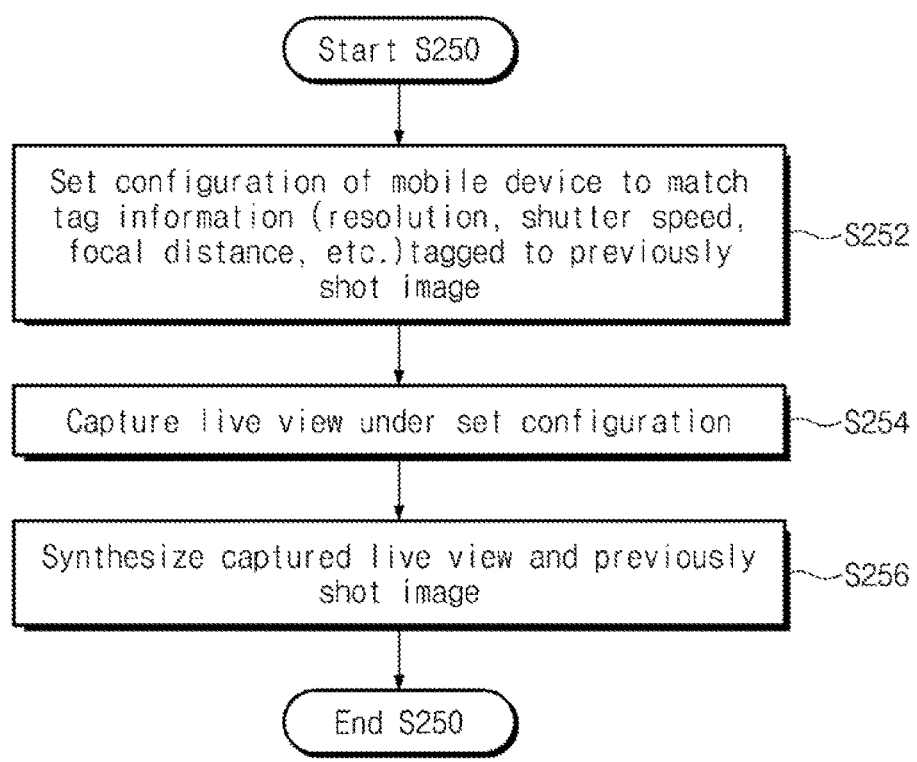
FIG. 12 is a flowchart illustrating operation S250 of FIG. 10 in more detail.

FIG. 12 is a flowchart illustrating operation S250 of FIG. 10 in more detail.

In operation S252, the mobile device 100 may be set so that the tag information tagged to the previously shot image 102 matches the current configuration of the mobile device 100. However, the configuration of the mobile device 100 is not necessarily required to be set to match all of the pieces of tag information illustrated in FIG. 9, and thus may be set to match major pieces of tag information such as resolution, shutter speed, lens aperture, exposure time, focal distance, or the like. This is intended to naturally synthesize the captured live view 101 and the previously shot image 102 without giving a sense of difference.

For example, such a configuration related to the camera module of the mobile device 100 may be automatically set by the application, firmware, or software installed in the mobile device 100.

In operation S254, the image of the subject may be shot according to the configuration set in operation S252. That is, the live view 101 displayed on the display of the mobile device 100 may be captured.

In operation S256, the image shot in operation S254 may be synthesized with the previously shot image 102. As a result, the situation at the time of shooting the previously shot image 102 may be reproduced as it was.

The situation reproducing method using the mobile device 100 has been described briefly with reference to FIGS. 9 to 12. In the present embodiment, unlike the embodiments of FIGS. 1 to 8, the guide information is provided to the user by additionally using the tag information tagged to the previously shot image 102. That is, not only the guide information based on a result of comparison of the keypoints but also the guide information based on the tag information is provided, so that the situation at the time of image shooting may be reproduced more accurately and easily.

Figure 13:
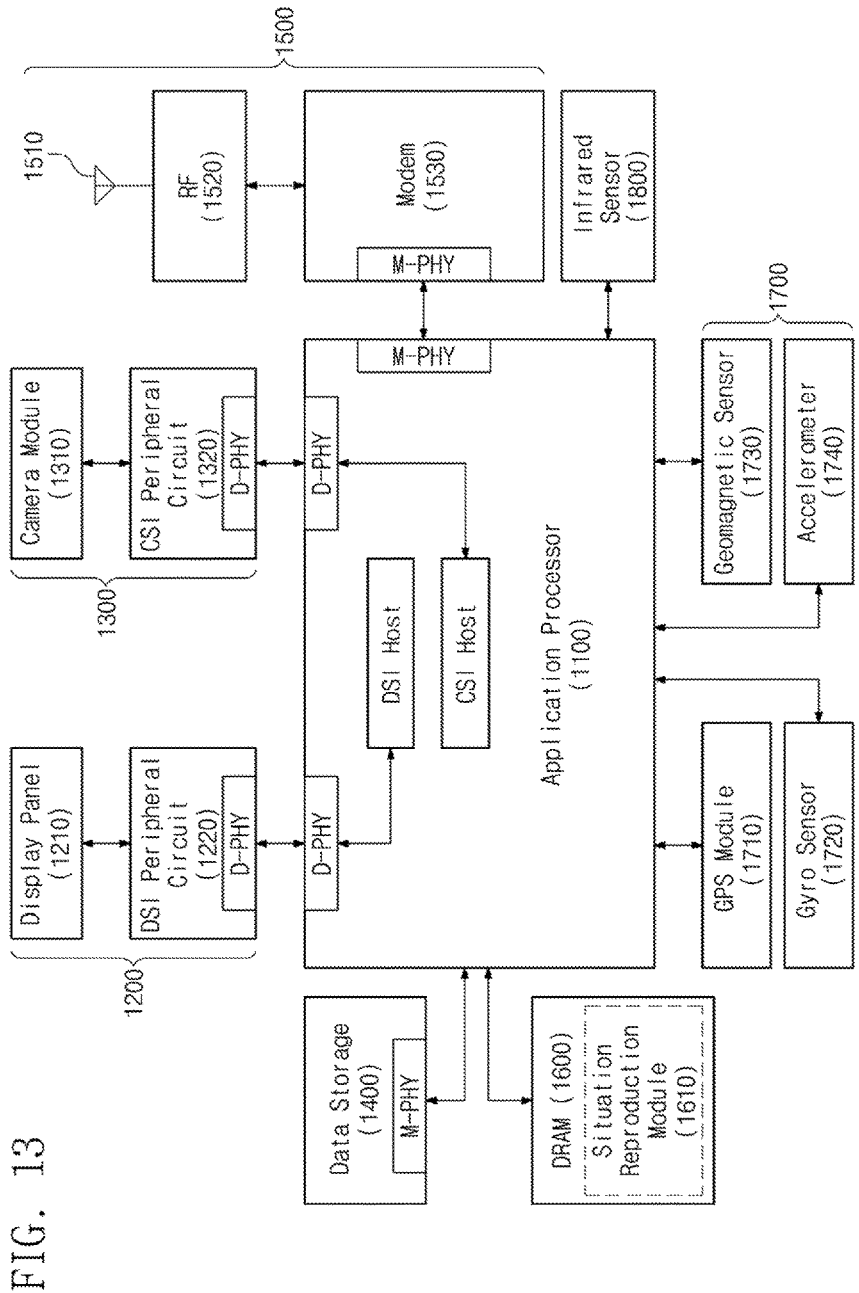
FIG. 13 is a block diagram illustrating a mobile device including a situation reproduction module configured to execute a situation reproducing method according to an embodiment of the inventive concept.

FIG. 13 is a block diagram illustrating a mobile device including a situation reproduction module 1610 configured to execute a situation reproducing method according to an embodiment of the inventive concept. For example, a mobile device 1000 may be various electronic devices such as a smartphone, a tablet PC, or a digital camera. Referring to FIG. 13, the mobile device 1000 may be configured to support a mobile industry processor interface (MIPI) standard or an Embedded DisplayPort (eDP) standard. The mobile device 1000 may include an application processor 1100, a display unit 1200, an image processing unit 1300, a data storage 1400, a wireless transmission/reception unit 1500, a DRAM 1600, an attitude heading reference system (AHRS) 1700, and an infrared sensor 1800.

The application processor 1100 may control overall operation of the mobile device 1000. The application processor 1100 may include a DSI host for interfacing with the display unit 1200 and a CSI host for interfacing with the image processing unit 1300.

The display unit 1200 may include a display panel 1210 and a display serial interface (DSI) peripheral circuit 1220. The display panel 1210 may display image data. The DSI host installed in the application processor 1100 may perform serial communication with the display panel 1210 via a DSI. The DSI peripheral circuit 1220 may include a timing controller, a source driver, etc. required to drive the display panel 1210. The display panel 1210 may display the guide information for giving instructions to adjust the location, angle, or tilt of the mobile device 1000. However, an embodiment of the inventive concept is not limited thereto, and thus the guide information may be provided to the user through a speaker (not shown) provided in the mobile device 1000.

The image processing unit 1300 may include a camera module 1310 and a camera serial interface (CSI) peripheral circuit 1320. The camera module 1310 and the CSI peripheral circuit 1320 may include a lens, an image sensor, etc. Image data generated in the camera module 1310 may be processed in an image processor, and a processed image may be transferred to the application processor 1100 via a CSI.

The data storage 1400 may include an embedded storage and a removable storage. The embedded storage and the removal storage may communicate with the application processor 1100 via an M-PHY layer. For example, the application processor 1100 and the removable storage may communicate using various card protocols (e.g., UFDs, MMC, eMMC secure digital (SD), mini SD, Micro SD, etc.). The embedded storage and the removable storage may be configured with a nonvolatile memory such as a flash memory.

The wireless transmission/reception unit 1500 may include an antenna 1510, an RF unit 1520, and a modem 1530. FIG. 13 illustrates that the modem 1530 communicates with the application processor 1100 via an M-PHY layer. However, according to embodiments of the inventive concept, the modem 1530 may be installed in the application processor 1100.

Various applications, firmware, software, or the like to be executed by the application processor 1100 may be loaded on the DRAM 1600. For example, the situation reproduction module 1610 according to an embodiment of the inventive concept may be loaded on the DRAM 1600. The situation reproduction module 1610 loaded on the DRAM 1600 may be executed by the application processor 1100. Although FIG. 13 exemplarily illustrates a DRAM, an embodiment of the inventive concept is not limited thereto, and thus various memory devices may be used to load the situation reproduction module 1610 so that the situation reproduction module 1610 is executed by the application processor 1100.

The AHRS 1700 may include devices for collecting or measuring various data required to execute the situation reproduction module 1610. For example, the AHRS 1700 may include a GPS module 1710, a gyro sensor 1720, a geomagnetic sensor 1730, and an accelerometer 1740. Coordinates of an image shooting location measured by the GPS module 1710 may be tagged to an image file obtained by shooting an image of a subject, so as to be used to reproduce the situation at the time of image shooting. Data measured by the gyro sensor 1720 may be used in reproducing the situation at the time of image shooting by adjusting an angle of the mobile device 1000 by the user. An image shooting direction measured by the geomagnetic sensor 1730 may be tagged to the image file obtained by shooting the image of the subject, so as to be used to reproduce the situation at the time of image shooting.

The infrared sensor 1800 may be used to perform an auto-focusing function of the camera module 1310. That is, the distance between the image shooting place and the subject may be approximately measured by using the auto-focusing function for focusing on the subject by irradiating infrared light to the subject and measuring a time taken for the infrared light to be reflected and return. The measured distance may be tagged to the image file obtained by shooting the image of the subject, so as to be used to reproduce the situation at the time of image shooting.

According to embodiments of the inventive concept, a method and system for reproducing a past situation by using a previously shot image and a live view output to a mobile device may be provided.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method for reproducing a situation using a mobile device having an image shooting function, the method comprising:
   extracting first keypoints from a live view output to a display of the mobile device;
   extracting second keypoints from a previously shot image;
   calculating a tilt of the mobile device at which the first keypoints are mapped to the second keypoints within a critical range; and
   synthesizing the previously shot image with the live view in a state where the mobile device has been adjusted according to guide information based on a result of the calculating.

2. The method of claim 1, further comprising:
   providing the guide information for adjusting the tilt of the mobile device on the basis of the result of the calculating.

3. The method of claim 2, wherein the guide information is output to the display of the mobile device, or is provided via a speaker provided in the mobile device.

4. The method of claim 1, wherein the calculating the tilt of the mobile device is performed by comparing an inclination and a twist of a straight line formed by two keypoints selected from among the first keypoints with an inclination and a twist of a straight line formed by two keypoints selected from among the second keypoints.

5. The method of claim 1, wherein the synthesizing comprises:
   extracting tag information tagged to the previously shot image;
   setting a configuration of the mobile device according to the tag information;
   capturing the live view under the set configuration; and
   synthesizing the captured live view and the previously shot image.

6. The method of claim 5, wherein the tag information comprises at least one of an image size, a resolution, a bit depth, a shutter speed, a lens aperture, an exposure time, a focal distance, a subject distance, an image shooting location, an image shooting direction, or a zoom ratio.

7. The method of claim 1, wherein the first keypoints and the second keypoints are extracted using at least one of a speeded up robust features (SURF) algorithm, a scale-invariant feature transform (SIFT) algorithm, a features from accelerated segment test (FAST) algorithm, or a binary robust independent elementary features (BRIEF) algorithm.

8. The method of claim 1, wherein the previously shot image is selected from a storage device provided in the mobile device, a web storage, or a cloud storage.

9. A method for reproducing a situation using a mobile device having an image shooting function, the method comprising:
   providing first guide information for adjusting a location of the mobile device according to tag information tagged to a previously shot image;

extracting first keypoints from a live view output to a display of the mobile device;

extracting second keypoints from the previously shot image;

determining whether the first keypoints are mapped to the second key points within a critical range;

calculating a tilt of the mobile device at which the first keypoints are mapped to the second keypoints within the critical range, according to a result of the determining;

providing second guide information for adjusting the tilt of the mobile device on the basis of a result of the calculating; and synthesizing the previously shot image with the live view in a state where the mobile device has been adjusted according to the first guide information and the second guide information.

10. The method of claim 9, wherein the providing the first guide information comprises:

providing instructions to move the mobile device using GPS information tagged to the previously shot image;

providing instructions to move the mobile device using subject distance information tagged to the previously shot image; and providing instructions to adjust an orientation of the mobile device using direction information tagged to the previously shot image.

11. The method of claim 9, wherein the calculating the tilt of the mobile device is performed by comparing an inclination and a twist of a straight line formed by two keypoints selected from among the first keypoints with an inclination and a twist of a straight line formed by two keypoints selected from among the second keypoints.

12. The method of claim 9, wherein the first guide information and the second guide information are output to the display of the mobile device, or are provided via a speaker provided in the mobile device.

13. The method of claim 9, wherein the synthesizing comprises:

setting a configuration of the mobile device according to the tag information tagged to the previously shot image;

capturing the live view under the set configuration; and synthesizing the captured live view and the previously shot image.

14. The method of claim 9, wherein the tag information comprises at least one of an image size, a resolution, a bit depth, a shutter speed, a lens aperture, an exposure time, a focal distance, a subject distance, an image shooting location, an image shooting direction, or a zoom ratio.

15. A mobile device comprising:

a situation reproduction module configured to extract first keypoints from a live view output to a display and second keypoints from a previously shot image, calculate a tilt of the mobile device at which the first keypoints are mapped to the second keypoints within a critical range, and synthesize the previously shot image with the live view in a state where the mobile device has been adjusted according to guide information based on a result of the calculation;

a memory configured to load the situation reproduction module; and an application processor configured to execute the situation reproduction module loaded on the memory.

16. The mobile device of claim 15, wherein the situation reproduction module generates the guide information for providing instructions to adjust a location of the mobile device according to tag information tagged to the previously shot image.

17. The mobile device of claim 16, further comprising:

a GPS module configured to measure the location of the mobile device;

a gyro sensor configured to calculate the tilt of the mobile device; and a geomagnetic sensor configured to measure an image shooting direction of the mobile device.

18. The mobile device of claim 16, wherein the tag information comprises at least one of an image size, a resolution, a bit depth, a shutter speed, a lens aperture, an exposure time, a focal distance, a subject distance, an image shooting location, an image shooting direction, or a zoom ratio.

19. The mobile device of claim 15, wherein the situation reproduction module calculates the tilt by comparing an inclination and a twist of a straight line formed by two keypoints selected from among the first keypoints with an inclination and a twist of a straight line formed by two keypoints selected from among the second keypoints.

20. The mobile device of claim 15, wherein the first keypoints and the second keypoints are extracted using at least one of a speeded up robust features (SURF) algorithm, a scale-invariant feature transform (SIFT) algorithm, a features from accelerated segment test (FAST) algorithm, or a binary robust independent elementary features (BRIEF) algorithm.

* * * * *